US007621989B2

(12) United States Patent
Forslund

(10) Patent No.: US 7,621,989 B2
(45) Date of Patent: Nov. 24, 2009

(54) FILTER STRUCTURE, FILTER PANEL COMPRISING THE FILTER STRUCTURE AND METHOD FOR MANUFACTURING THE FILTER STRUCTURE

(75) Inventor: Mikael Forslund, Vallingby (SE)

(73) Assignee: Camfil AB, Trosa (SE)

( * ) Notice: Subject to any disclaimer, the term of this patent is extended or adjusted under 35 U.S.C. 154(b) by 566 days.

(21) Appl. No.: 10/542,617

(22) PCT Filed: Jan. 20, 2004

(86) PCT No.: PCT/SE2004/000063

§ 371 (c)(1),
(2), (4) Date: Dec. 28, 2005

(87) PCT Pub. No.: WO2004/065001

PCT Pub. Date: Aug. 5, 2004

(65) Prior Publication Data

US 2006/0169144 A1      Aug. 3, 2006

Related U.S. Application Data

(60) Provisional application No. 60/481,662, filed on Nov. 19, 2003.

(30) Foreign Application Priority Data

Jan. 22, 2003    (SE)   .................................... 0300148

(51) Int. Cl.
    *B01D 53/02*      (2006.01)
(52) U.S. Cl. ............................ 96/154; 96/134; 96/135; 55/524

(58) Field of Classification Search ................... 55/486, 55/487, 489, 527, 528, 524, DIG. 13, DIG. 42, 55/502; 96/134, 135, 154, 153, 108; 210/502.1, 210/505, 496, 495, 493.1
See application file for complete search history.

(56) References Cited

U.S. PATENT DOCUMENTS 3,175,339 A    *    3/1965    McDowell .................... 95/142

(Continued)

FOREIGN PATENT DOCUMENTS

EP      0666095      8/1995

(Continued)

OTHER PUBLICATIONS

"Japanese Application Serial No. 2006-500756, Official Action mailed Feb. 13, 2009", 8 pgs.

*Primary Examiner*—Duane Smith
*Assistant Examiner*—Dung Bui
(74) *Attorney, Agent, or Firm*—Schwegman, Lundberg & Woessner, P.A.

(57) ABSTRACT

A pleatable filter structure for use in a filter panel, containing ion exchange particles distributed within a fibrous framework is expanded to contain enough space to allow the ion exchange particles to swell or to be in a swelled state as compared to dry ion exchange particles, without additional expansion of the filter structure. A method of manufacturing the filter structure involves subjecting the filter structure to a moisture treatment in which it is exposed to a humid or water containing environment, whereby the ion exchange particles swell and cause a permanent expansion of the filter structure.

31 Claims, 6 Drawing Sheets

U.S. PATENT DOCUMENTS

| | | | | |
|---|---|---|---|---|
| 3,620,677 | A * | 11/1971 | Ayers | 422/56 |
| 3,698,984 | A * | 10/1972 | Goulet et al. | 156/330 |
| 4,045,352 | A | 8/1977 | Rembaum et al. | |
| 4,498,989 | A * | 2/1985 | Miyakawa et al. | 210/450 |
| 4,929,090 | A * | 5/1990 | Grahm | 374/102 |
| 5,039,413 | A * | 8/1991 | Harwood et al. | 210/457 |
| 5,376,278 | A * | 12/1994 | Salem | 210/679 |
| 5,486,410 | A * | 1/1996 | Groeger et al. | 442/353 |
| 5,500,038 | A * | 3/1996 | Dauber et al. | 96/135 |
| 5,507,847 | A * | 4/1996 | George et al. | 55/486 |
| 5,662,728 | A * | 9/1997 | Groeger | 96/153 |
| 5,688,299 | A * | 11/1997 | Goodwin | 55/385.3 |
| 5,876,601 | A * | 3/1999 | Geibel et al. | 210/493.1 |
| 5,902,482 | A * | 5/1999 | Seeley et al. | 210/493.1 |
| 6,027,553 | A * | 2/2000 | Hirano et al. | 95/283 |
| 6,099,612 | A * | 8/2000 | Bartos | 55/481 |
| 6,210,458 | B1 * | 4/2001 | Shindo et al. | 55/486 |
| 6,223,463 | B1 * | 5/2001 | Carlson et al. | 43/108 |
| 6,228,135 | B1 * | 5/2001 | Sugo et al. | 55/528 |
| 6,238,467 | B1 * | 5/2001 | Azarian et al. | 96/135 |
| 6,273,271 | B1 * | 8/2001 | Moya | 210/490 |
| 6,299,945 | B1 * | 10/2001 | Mertz et al. | 427/503 |
| 6,352,579 | B1 * | 3/2002 | Hirata et al. | 96/134 |
| 6,354,443 | B1 * | 3/2002 | Moya | 210/490 |
| RE37,701 | E * | 5/2002 | Bahar et al. | 442/171 |
| 6,402,819 | B1 | 6/2002 | De Ruiter et al. | |
| 6,572,956 | B1 * | 6/2003 | Pickett et al. | 428/212 |
| 6,657,196 | B2 * | 12/2003 | Endo et al. | 250/339.11 |
| 6,758,876 | B2 * | 7/2004 | Suzuki et al. | 55/385.6 |
| 6,818,038 | B2 * | 11/2004 | Sugo et al. | 55/524 |
| 6,824,595 | B2 * | 11/2004 | Ueki et al. | 96/134 |
| 7,014,050 | B1 * | 3/2006 | Ogata et al. | 210/489 |
| 7,273,650 | B2 * | 9/2007 | Pickett et al. | 428/141 |
| 7,487,808 | B2 * | 2/2009 | Stoye et al. | 141/315 |
| 2002/0071958 | A1 * | 6/2002 | Mertz et al. | 428/447 |
| 2002/0100264 | A1 * | 8/2002 | Rivera et al. | 55/497 |
| 2002/0124906 | A1 * | 9/2002 | Suzuki et al. | 141/98 |
| 2003/0056653 | A1 * | 3/2003 | Ueki et al. | 96/134 |
| 2004/0118765 | A1 * | 6/2004 | Yavorsky et al. | 210/290 |
| 2004/0187451 | A1 * | 9/2004 | Suzuki et al. | 55/385.1 |
| 2004/0194624 | A1 * | 10/2004 | Ohya et al. | 95/273 |
| 2004/0229977 | A1 * | 11/2004 | Watson et al. | 523/171 |
| 2005/0218068 | A1 * | 10/2005 | Komatsu et al. | 210/500.27 |
| 2005/0256248 | A1 * | 11/2005 | Tada | 524/496 |
| 2006/0164740 | A1 * | 7/2006 | Sone et al. | 359/883 |

FOREIGN PATENT DOCUMENTS

| | | |
|---|---|---|
| JP | 2-26612 | 1/1990 |
| JP | 8-503272 | 4/1996 |
| JP | 2001-259339 | 9/2001 |
| JP | 2002-248308 | 9/2002 |
| JP | 2002-292232 | 10/2002 |

* cited by examiner

FILTER STRUCTURE, FILTER PANEL COMPRISING THE FILTER STRUCTURE AND METHOD FOR MANUFACTURING THE FILTER STRUCTURE

CROSS REFERENCE TO RELATED APPLICATIONS

This application is a national stage application of International Application PCT/SE04/00063, filed Jan. 20, 2004, designating the United States of America, which claims the benefit of Swedish Patent Application No. 0300148-4, filed Jan. 22, 2003 and claims the benefit of U.S. Patent Application No. 60/481,662, filed Nov. 19, 2003.

FIELD OF THE INVENTION

The present invention relates to a pleated ion exchange adsorbent filter structure for removal of gaseous compounds in air and a process for production of such a filter structure.

BACKGROUND OF THE INVENTION

Adsorption filters are used to remove undesired substances from gaseous or fluid mixtures. The present invention especially deals with filters for air filtration. Adsorbent particles, such as active carbon particles, clean undesired substances out of air carried through the filter. The adsorbent particles are often fixed or mounted on a supporting frame. Modern industrial developments have resulted in increasingly stringent requirements with regard to clean air. Such industrial developments are, for example, the manufacture of highly sensitive products, such as semiconductors and microelectronic devices. This type of manufacture is performed in cleanrooms with extremely high demands for particle cleanliness. In the mid nineties the increasing miniaturization reached a level where also gaseous chemicals resulted in yield damage. These yield-damaging chemicals are denoted as airborne molecular contamination (AMC). Semiconductor Equipment and Materials International (SEMI) in the standard SEMI F21-951 have given a classification system for AMC gases. This standard divides AMC into four classes: Acids, Bases, Condensables and Dopants. Ion exchange adsorbents can be used to filter all types of acidic or alkaline substances.

The earlier conventional adsorption filters for removal of an acid compound, such as HCl or a basic compound, such as ammonia have relied on a chemical impregnation that is loosely bonded to its substrate. The impregnation may under some circumstances even result in a contamination itself. These chemically impregnated filters have in some cases much lower capacity than an ion exchange adsorbent filter.

Another type of adsorption filter incorporating ion exchange particles has recently been developed, which uses ion exchange particles. Such an ion exchange particles containing adsorption filter is described in U.S. Pat. No. 6,402,819 B1. This filter comprises ion exchange beads fixed to a support made of reticulated polymer foam or a textile web.

In an adsorption filter using reticulated polymer foam as support, the adsorbent beads are fixed to the pore structure of the reticulated polymer foam. The pore structure of reticulated polymer foams has, due to its manufacture, a varying pore size, which leads to a varying adsorbent load. It is thus difficult to distribute the ion exchange beads evenly in the foam support, both in the surface direction and in the thickness direction. The adsorbent load also varies between different individual filters. Due to the uncertainty of the absorbent load of the filters, only a minimum adsorbent load and thus a minimum filtration capacity can be guaranteed to the user. This is a significant problem, since a portion of the adsorbent, which is often very expensive, may be unused. The open structure of a foam support is indeed beneficial from a pressure drop standpoint, but it makes it impossible to achieve high initial removal efficiency at the short contact times between air and filter structure necessary to minimize pressure loss over the filter. Furthermore, since the adsorbent load of the foam support depends on the pore structure, it is not possible to fine-tune the adsorbent load versus efficiency versus pressure drop characteristics.

Another type of support for the ion exchange beads that is also suggested in U.S. Pat. No. 6,402,819 is a textile web. A textile web support has the advantage that it can be pleated, which is advantageous with respect to the pressure drop. However, problems occur when such textile web structures are to be pleated to a filter element and mounted and fixed in a filter panel frame, since the filter element will become distorted when used in the filtering application.

There is thus a need for an improved filter structure that does not suffer from the above drawbacks.

SUMMARY OF THE INVENTION

The present invention relates to a pleatable filter structure for use in a filter panel, containing ion exchange particles distributed within a fibrous framework. The filter structure is expanded so as to contain enough space to allow the ion exchange particles to swell or to be in a swelled state as compared to dry ion exchange particles, without additional expansion of the filter structure.

In a preferred embodiment of the invention the fibrous framework of the filter structure comprises composite structural fibers and composite thermoplastic fibers, the composite structural fibers comprising a first relatively higher melting component and a first relatively lower melting component, the first relatively higher melting component having a melting point at least 20° C. higher than the first relatively lower melting component, and the composite thermoplastic fibers having a relatively smaller denier than the structural fibers and comprising a second relatively higher melting component and a second relatively lower melting component, wherein the composite structural fibers form a thermally bonded, fibrous network in which the first relatively lower melting component bonds the structural fibers together at the cross over points to stabilize the fibrous network, and the composite thermoplastic fibers are dispersed throughout and bonded to the fibrous network by the application of heat so as to be immobilized, and wherein the ion exchange particles are bonded by the application of heat to the smaller denier composite thermoplastic fibers and the filter structure is expanded so as to contain enough space to allow the ion exchange particles to swell or to be in a swelled state as compared to dry ion exchange particles, without additional expansion of the filter structure.

In one embodiment the expanded filter structure preferably contains enough space to allow an increase of the ion exchange particle diameter of at least 38%, as compared to dry particles.

In one embodiment the filter structure contains enough space to allow an increase of the ion exchange particle diameter of at least 47% as compared to dry particles.

In one embodiment the expansion of the filter structure has been achieved by a process in which the filter structure was exposed to a humid environment or water.

In one embodiment the ion exchange particles are macroporous polymers.

In one embodiment the load of ion exchange particles is 100-2000 g/m², preferably 300-1000 g/m² and most preferably 400-700 g/m².

In one embodiment the ion exchange particles are monospherical and has a diameter of 425-525 μm.

In one embodiment the fibrous framework comprises thermally bonded fibers.

In one embodiment the fibrous framework comprises thermally bonded, fibrous network of coarse structural thermoplastic fibers and having fine thermoplastic fibers of relatively smaller denier than the structural fibers being dispersed throughout and bonded to the fibrous framework by the application of heat so as to be immobilized, wherein the ion exchange particles are bonded by the application of heat to the smaller denier composite thermoplastic fibers.

The present invention also relates to a filter panel in which the filter structure is pleated and fixed into a filter panel frame.

In one embodiment the pleated filter structure has 0-25 pleats/dm, preferably 5-20 pleats/dm and most preferably 8-15 pleats/dm.

In one embodiment the height of the pleats is 10-300 mm, preferably 15-150 mm and most preferably 15-100 mm.

In one embodiment the frame is made of stainless steel or aluminum.

In one embodiment the pleated filter structure is fixed to the frame by means of a polyurethane adhesive, having a total outgassing lower than 10 μg/g, confirmed by thermal desorption gas chromatography mass spectroscopy (TD-GC-MS) with TD performed at 50° C. for 30 min and n-decane as external standard.

In one embodiment exterior sealing strips for avoiding air bypass are made from a polymer having a total outgassing lower than 10 μg/g, confirmed by thermal desorption gas chromatography mass spectroscopy (TD-GC-MS) with TD performed at 50° C. for 30 min and n-decane as external standard.

The present invention also relates to a method of manufacturing the filter structure, wherein a pleatable filter structure including ion exchange particles distributed in a fibrous framework, in which the pleatable filter structure is subjected to a moisture treatment in which it is exposed to a humid or water containing environment, whereby the ion exchange particles swell and cause a permanent expansion of the filter structure.

In one embodiment the fibers of the fibrous framework are stretched as a result of the swelling of the ion exchange particles, and remain stretched.

In one embodiment the filter structure is exposed to this environment until the ion exchange particles have reached a moisture content of at least 20% by weight.

In one embodiment the filter structure is exposed to this environment until the ion exchange particles have reached a moisture content of at least 30% by weight.

In one embodiment the ion exchange particles have a moisture content of less than 10% prior to the moisture treatment and present an increase in diameter during the moisture treatment of up to 38%.

In one embodiment the humid environment used in the moisture treatment has an absolute moisture content equivalent of a relative humidity of at least 70% at a temperature of 20° C.

In one embodiment the humid environment used in the moisture treatment has an absolute moisture content equivalent of a relative humidity of at least 80%, preferably at least 90% at a temperature of 30° C.

In one embodiment the filter structure is subjected to the moisture treatment in a batch process.

In one embodiment the filter structure is subjected to the moisture treatment in a continuous process.

DETAILED DESCRIPTION OF THE PREFERRED EMBODIMENTS

Figure 1:
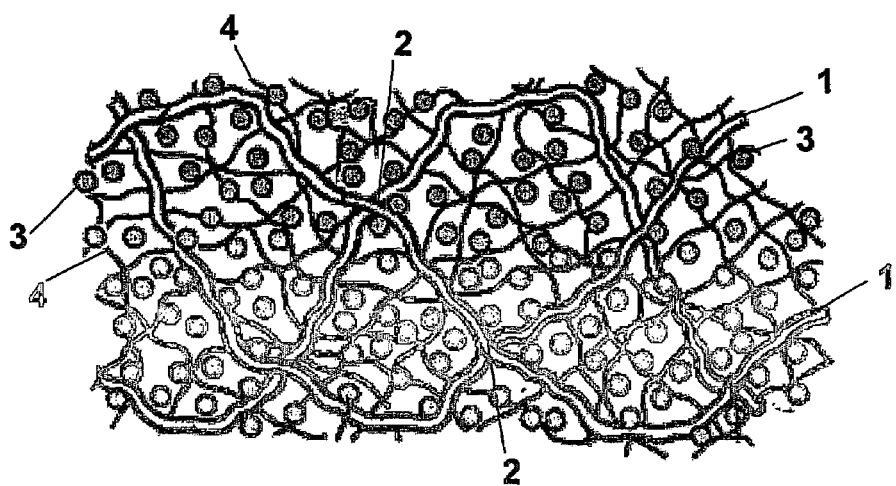
FIG. 1 is a representation of a cross-section through a filter structure of the present invention.

The ion exchange particle filters of the present invention comprise a fibrous supporting framework in which the ion exchange particles are distributed. The fibrous supporting framework may be of any type, as long as it contains fibers that are stretchable and have a low elasticity. This means that the fibers can be drawn out by means of a pulling force, and they do not return to their original state as the pulling force is released. Such fibers may be natural fibers or synthetic fibers. As an example the framework comprises a plastically expandable structure that immobilizes the ion exchange particles, which structure may be made of metal, polymer or natural fiber structural members.

A general property of ion exchange particles is that they swell and shrink depending on relative moisture and thus show a substantial diameter variation. This fact complicates all areas of use where the particles are rigidly fixed with respect to each other or between fixed walls of any kind. The swelling effect can even burst closed containers of steel. Surprisingly this also affects their use in a flexible fabric or framework that can be pleated.

The invention relates to the development of a pre-expansion process that through controlled humidification, pleating and fixation in a supporting structure produces a framework in which subsequent humidity variations will not distort the shape of the said framework.

The invention is applicable to frameworks, in which the ion exchange particles are bonded by subjecting the network structure of the framework to an increased temperature in the range of 70-200° C. during a short time period, or in which the ion exchange particles are added in their dry form regardless of temperature, under the provision that the framework can be plastically expanded to accommodate the particles whether these are at their minimum or maximum diameter.

The ion exchange particles may be strongly acidic cation exchange particles, weakly acidic cation exchange particles, strongly basic anion exchange particles or weakly basic anion exchange particles (FIGS. 4-7). In strong cation exchange particles the chemical groups are usually sulfonic acid groups, while strong anion exchange particles may contain quaternary ammonium groups. The ion exchange particles are preferably spherical beads of basic anion exchange particles or acidic cation exchange particles. They are usually in the form of spheres of a size of up to 1 millimeter. The spheres consist of macroporous or geltype polymers, mostly on the basis of styrene, usually crosslinked in the form of styrene/divinylbenzene polymers bearing chemical groups with exchangeable ion functional groups, which permit the desired exchange. Macroporous polymers are preferred since they have desired porosity and have a greater ability to withstand structural damage at a variation in moisture content. Ion exchange particles normally contain water. The water content of the ion exchange particles is influenced by the relative air humidity of the environment in which the particles are present. The higher the relative air humidity is, the more water is absorbed by the ion exchange particles. As the ion exchange particles absorb water, they increase in size, and they shrink when drying. At a relative humidity of 100% the ion exchange particles contain about 50% by weight of water, and at a relative humidity of 50% the ion exchange particles contain about 20% by weight of water. There is thus an equilibrium between the relative air humidity and the water content, and consequently the size, of the ion exchange particles. However, it may sometimes take some time to reach the equilibrium water content of the ion exchange particles, depending on how they are exposed to the humidity of the air.

The water content of ion exchange particles in a filter cloth depends partly of the initial water content of the ion exchange particles, i.e. before incorporating the particles into the filter cloth. The manufacturing process of the filter cloth may also have a considerable influence on the ion exchange particle water content of the final filter cloth. Consequently, some filter cloths have ion exchange particles with a very low water content, and some have ion exchange particles with a higher water content. The water content of the ion exchange particles directly after the manufacture of the filter cloth is practically always lower (which means that the particle size is smaller) than the equilibrium water content of the ion exchange particles during the filtering application. In some processes for manufacturing filter cloths, the ion exchange particles will be practically dry. In all processes were the degree of humidity of the ion exchange particles is lower than in the intended application the resulting filter cloth cannot successfully be converted into a fixed pleated structure without previously being treated so as to achieve an expansion of the fibrous framework, by the method of the present invention.

As the ion exchange particles constitute a chemically active media, the filter cloth is usually packed in more or less airtight packages before storage. The ion exchange particles thus remain in the state they were, i.e. very dry, after the manufacturing process until the filter cloth is to be used in a filtering application.

Figure 9:
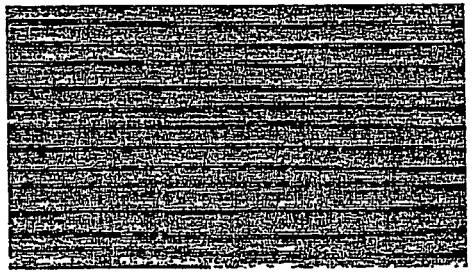
FIG. 9 shows another example of a distorted pleat section of a filter panel
Figure 10:
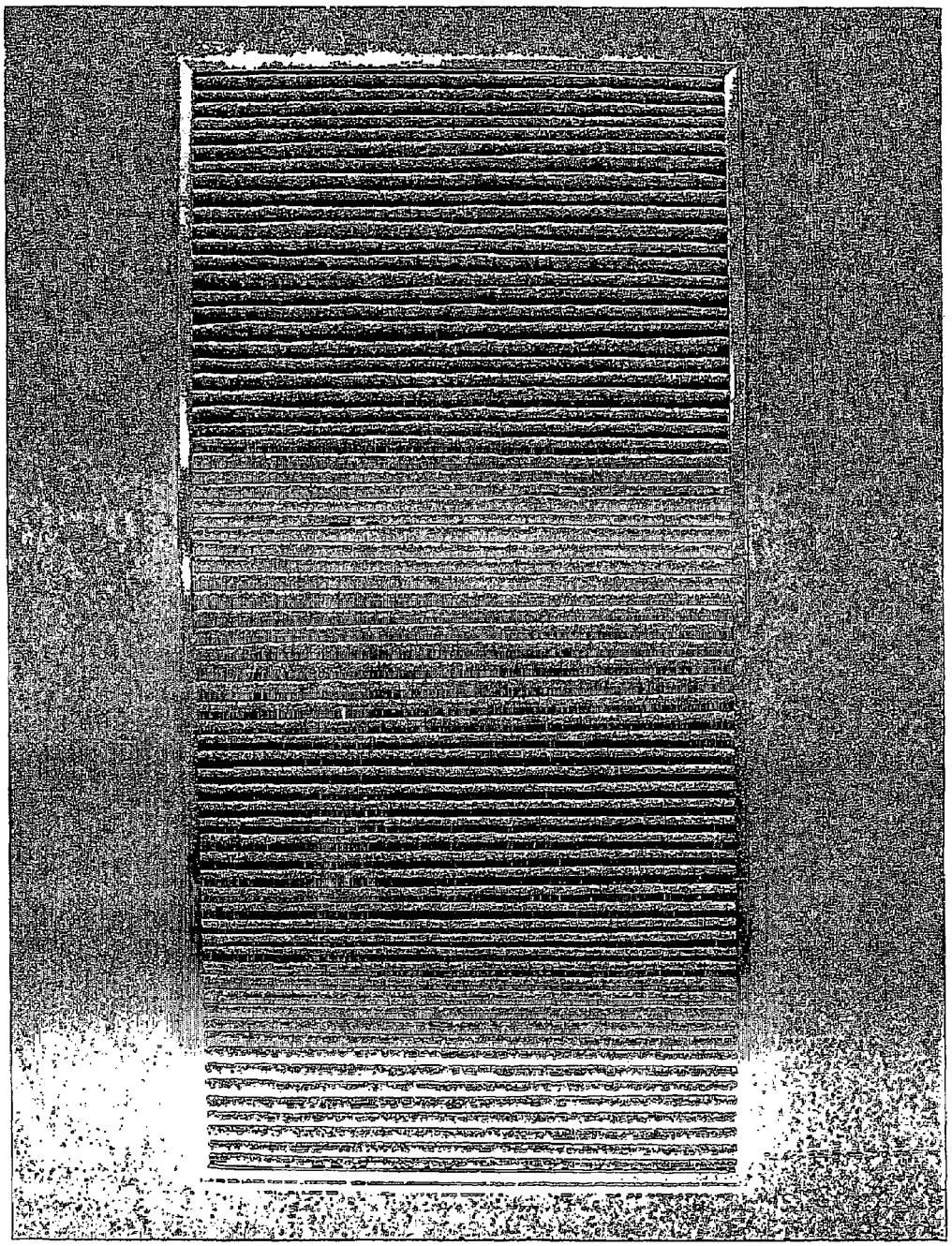
FIG. 10 shows a finished panel after correct humidification and manufacture.

When the filter cloth is to be used as a filter element in a filter panel it must be pleated, in order to achieve satisfactory absorptive capacity and a sufficiently low pressure drop at the air speeds in question, which are normally between 0.3 and 3 m/s towards the face of the panel. If the filter cloth were pleated and fixed into a panel frame directly subsequent to the filter cloth forming process or directly after unpacking, it would distort severely when exposed to air of normal air humidity, i.e. air having a relative humidity of around 50%, and even worse at higher relative humidities that are often the case in certain filtering applications. This distortion is due to the considerable swelling that the ion exchange beads of the filter structure present a when exposed to humidity. Since the ion exchange beads are rather tightly entrapped in the fibrous framework, they have no free space to swell, and thus the swelling leads to an increase in size of the filter structure. The pressure that the ion exchange particles convey to its surroundings is considerable, in a sealed vessel it can reach several 100 bars. The increase of the filter structure may be about 20% in area and thickness in a relative air humidity of 50%. Consequently, the pleated filter structure becomes too large to fit into the frame into which it is fixed, for which reason it becomes distorted. Examples of such distorted filter panel are shown in FIGS. 9 and 10.

The swelling of the ion exchange particles proceeds gradually until the water content of the ion exchange particles is in equilibrium with the ambient air. A rolled up filter structure may be stored at normal air humidity for a long time without reaching an equilibrium between the moisture content of the ion exchange particles and the ambient air. At 50% relative air humidity, the ion exchange beads will have a moisture content of approximately 25% by weight. When the moisture content of the ion exchange particles increases from the initial practically dry state to 25% by weight, as much as 80-85% of the total possible increase in diameter takes place. This corresponds to a swelling of 160% by volume. A saturated ion exchange particle contains about 50% by weight of water and its diameter has increased 47% as compared with a dry particle.

In order to avoid distortion of the pleated filter element in the resulting filter panel the filter structure is subjected to a moisturizing treatment, in which it is exposed to a humid or water containing environment prior to pleating. This moisturizing treatment or humidification step is performed by exposing the rolled out filter structure to clean air, i.e. air free of the substances that the filter structure intend to filtrate in the finished filter of certain humidity or by spraying it with a water aerosol. The humidifying treatment may be performed batch-wise in a chamber or as a continuous process step integrated in the apparatus in which the pleating of the filter structure is carried out. The relative humidity of the humidifying air should exceed the relative air humidity of the intended filtering application, preferably by 20% in batch-wise treatment or by >20 in continuos treatment. For example, if the resulting filter panel is to be used in an application where the relative air humidity is 50%, the humidifying air should have a relative air humidity of 70-80%. The humidification is continued until the ion exchange particles of the filter cloth is in equilibrium with the humidity in the treating chamber or has reached a predetermined level in continuos treating operation. The relative humidity of air in a clean room, which is a particularly suitable application of the filter structure of the present invention, is usually 45-55%.

Although the positive effect of the moisturizing treatment is most distinct in the case of pleated filter panels, a clearly positive effect will also be noticed in flat filter panels, i.e. non-pleated panels. A flat filter panel does not contain as large amount of ion exchange particles per surface area as a pleated filter panel, but the expansion behavior of the ion exchange particles does nevertheless affect the flat filter panel in a similar manner. The moisturizing treatment of the present invention is thus applicable both to pleated and non-pleated filter panels.

During the humidification the ion exchange particles adsorb moisture from the humid air and swell to a certain degree that depends on the relative humidity of the humidifying air. As the ion exchange particles swell, they stretch the fibers of the fibrous framework. The size of the space in which an ion exchange particle is entrapped thus follows the size of the ion exchange particles. The humidification is continued until the fibrous framework has reached the desired size, which means swelling of the ion exchange particles to a size slightly larger than the size of the ion exchange particles will reach in the actual filtering application. The fibrous framework has then been expanded to such an extent that the spaces can accommodate a swelled ion exchange particle. The fibers of the fibrous framework are made of a comparatively inelastic material. The stretching of the fibers and thus the expansion of the fibrous framework is thus a practically irreversible process, since the fibers do not return to their original non-stretched state. The expanded filter structure may now be directly pleated in a pleating equipment, cut and fixed into a filter panel frame. The expanded filter structure may also be stored until needed for the manufacture of a filter panel. In such a case a humidity conserving wrapping is most advantageous, since that ensures that the expanded filter structure does not contract or shrink. The finished filter panel may be stored in an environment having a lower relative humidity than the environment of the intended filtering application, but the ion exchange particles will then shrink to a smaller size. However, the ion exchange particles remain secured within the fibrous framework, by adhesive or by fusion points depending on what type of filter cloth is used. When the ion exchange particles are secured to the framework by an adhesive, it is important that the adhesive does not impair the expansion characteristics of the framework structure, and that the adhesive complies with any outgassing requirements set on the filter structure. Each space in the filter cloth that accommodates an ion exchange particle will then, as the ion exchange particles shrink, apart from the ion exchange particle contain an empty space. When the filter structure is once again exposed to the environment of higher relative humidity in the filtering application, the ion exchange particles return to their swelled state. This swelling does not cause any expansion of the fibrous framework, since the spaces that accommodate the ion exchange particles are large enough to accommodate swelled ion exchange particles. Such an expanded filter structure that is pleated and fixed into a filter panel, will thus not be distorted when exposed to the environment of the intended filtering application. The filter panel according to the present invention will thus not distort when used in the desired filtering application and will also stand a drier or slightly more humid environment. In practice however, the filter panel would not be exposed to any large variations in air humidity before actual use, since it anyway has to be wrapped in order to protect the ion exchange particles from chemical components in the ambient air.

The present invention thus relates to a pleatable filter structure for use in a filter panel, containing ion exchange particles distributed within a fibrous framework. The filter structure is expanded so as to contain enough space to allow the ion exchange particles to swell or to be in a swelled state as compared to dry ion exchange particles, without additional expansion of the filter structure.

In a preferred embodiment of the invention the fibrous framework of the filter structure comprises composite structural fibers 1 and composite thermoplastic fibers 4. The composite structural fibers 1 comprise a first relatively higher melting component and a first relatively lower melting component, the first relatively higher melting component having a melting point at least 20° C. higher than the first relatively lower melting component. The composite thermoplastic fibers 4 have a relatively smaller denier than the structural fibers 1 and comprise a second relatively higher melting component and a second relatively lower melting component. The composite structural fibers 1 form a thermally bonded, fibrous network in which the first relatively lower melting component bonds the structural fibers together at the cross-over points 2 to stabilize the fibrous network. The composite thermoplastic fibers 4 are dispersed throughout and are bonded to the fibrous network by the application of heat so as to be immobilized. The ion exchange particles are bonded by the application of heat to the smaller denier composite thermoplastic fibers 4 and the filter structure is expanded so as to contain enough space to allow the ion exchange particles to swell or to be in a swelled state as compared to dry ion exchange particles, without additional expansion of the filter structure.

The expanded filter structure contains enough space to allow an increase of the ion exchange particle diameter of preferably at least 38%, more preferably at least 47%, as compared to dry particles.

In one embodiment the expansion of the filter structure has been achieved by a process in which the filter structure was exposed to a humid environment or water.

The ion exchange particles may be macroporous polymers, and the load of ion exchange particles is suitably 100-2000 g/m$^2$, preferably 300-1000 g/m$^2$ and most preferably 400-700 g/m$^2$. The ion exchange particles are preferably monospherical and have a diameter of 425-525 µm.

In another embodiment the fibrous framework comprises thermally bonded fibers, preferably a thermally bonded, fibrous network of coarse structural thermoplastic fibers, having fine thermoplastic fibers of relatively smaller denier than the structural fibers being dispersed throughout and bonded to the fibrous framework by the application of heat so as to be immobilized, wherein the ion exchange particles are bonded by the application of heat to the smaller denier composite thermoplastic fibers.

The present invention also relates to a filter panel in which the filter structure is pleated and fixed into a filter panel frame. The pleated filter structure advantageously has 0-25 pleats/dm, preferably 5-20 pleats/dm and most preferably 8-15 pleats/dm. The height of the pleats is 10-300 mm, preferably 15-150 mm and most preferably 15-100 mm. The frame is suitably made of stainless steel or aluminum. The pleated filter structure is suitably fixed to the frame by means of a polyurethane adhesive. Preferably a polyurethane adhesive is used, which has a total outgassing lower than 10 µg/g, confirmed by thermal desorption gas chromatography mass spectroscopy (TD-GC-MS) with TD performed at 50° C. for 30 min and n-decane as external standard. Any exterior sealing strips for avoiding air bypass are suitably made from a polymer, which preferably has a total outgassing lower than 10 µg/g, confirmed by thermal desorption gas chromatography mass spectroscopy (TD-GC-MS) with TD performed at 50° C. for 30 min and n-decane as external standard.

The present invention also relates to a method of manufacturing the filter structure, wherein a pleatable filter structure including ion exchange particles distributed in a fibrous framework, in which the pleatable filter structure is subjected to a moisture treatment in which it is exposed to a humid or water containing environment, whereby the ion exchange particles swell and cause a permanent expansion of the filter structure.

In one embodiment the fibers of the fibrous framework are stretched as a result of the swelling of the ion exchange particles, and remain stretched. The filter structure is exposed to this environment until the ion exchange particles have reached a moisture content of at least 20% by weight, preferably at least 30% by weight.

The ion exchange particles may have a moisture content of less than 10% prior to the moisture treatment and present an increase in diameter during the moisture treatment of up to 38%. The humid environment used in the moisture treatment has suitably an absolute moisture content equivalent of a relative humidity of at least 70% at a temperature of 20° C. Preferably the absolute moisture content of the humid environment used in the moisture treatment is equivalent to a relative humidity of at least 80%, preferably at least 90% at a temperature of 30° C.

The moisture treatment may be performed in a batch process or in a continuous process.

The moisture treatment can be used for all ion exchange filter cloths that have a fibrous framework containing fibers, which are stretchable and have a low elasticity. A filter cloth that is particularly advantageous for the present application is described in EP 666 095 B1, which is hereby incorporated herein by reference. This filter cloth has a high degree of dimensional stability. It includes a stable framework of relatively larger denier composite fibers, thermoplastic fibers of relatively smaller denier dispersed throughout and bonded to the framework, and an ion exchange particle bonded to at least the smaller denier thermoplastic fibers. The larger denier fibers maintain the stability and permeability of the filter structure, which filter structure substantially is formed of the smaller denier fibers and the particles. The larger denier fibers should have a denier of at least about 30 dpf (denier per fiber) and should comprise a relatively higher melting component and a relatively lower melting component. The lower melting component bonds the fibers of the framework at the cross over points. The smaller denier fibers should have a denier of less than about 30 dpf and are dispersed throughout and bonded to the framework to immobilize the thermoplastic fibers and to provide a surface for attachment of the ion exchange particles. The ion exchange particles are bonded to at least the smaller denier thermoplastic fibers.

This filter cloth is advantageous over fibrous filter cloths that contain an adhesive, since the ion exchange particles are incorporated in the filter structure without the use of an adhesive. The use of adhesive has certain drawbacks, as will be discussed below. Firstly, the surface area of the ion exchange particles will be partially covered by adhesive, which may substantially decrease the adsorptive effect of the filter. Secondly, an additional unwanted characteristic of adhesive containing filters is the well-known problem of outgassing, i.e. that gaseous compounds are released from the filter panel itself, during use. Adhesives commonly used in the manufacture of ion exchange filter cloths have the disadvantage that they outgas AMC, such as medium and high boiling organic species, fire retardants, plasticisers and organophosphates.

By using a composite fiber cloth as the one described in EP 666 095 B1 an ion exchange adsorbent filter structure for use in filters for adsorption of acidic or alkaline airborne molecular compounds (AMC) from an air stream, having superior removal efficiency, superior capacity, a low pressure drop and which does not require the use of an adhesive to fix the adsorbent is provided.

The small and large denier fibers may be formed of the same material and may be sheath/core heterofilament fibers having a nylon sheath and a polyester core. A filter structure formed from such larger and smaller denier heterofilaments can be made having a thickness of from about 1.0 mm to 250 mm. The ion exchange particles may have an effective particle diameter from 0.1 µm to 5 mm depending on the selection of the framework composite fibers and the smaller denier thermoplastic fibers.

This suitable filter cloth is prepared by a method which comprises preparing a framework of the relatively larger denier composite fibers having a denier of 30 dpf or greater, and thermally bonding these fibers at the cross-over points. Smaller denier thermoplastic fibers are dispersed into the framework and these fibers have a denier of less than about 30. The smaller denier fibers are immobilized onto the framework and particles are dispersed onto the framework and thermally bonded to at least the smaller denier fibers.

The smaller denier fibers can be dispersed into the framework by hydro-entanglement or air-entanglement or some other suitable method. As an alternative, a web of relatively small denier thermoplastic fibers can be formed and larger denier fibers can be integrated into the smaller denier web to provide dimensional stability.

FIG. 1 illustrates a cross-section through a portion of the filter structure used in the present invention. The filter structure includes a stable framework of relatively larger denier composite structural fibers 1 that are thermally bonded at the cross-over points 2. By the term "structural fibers" is meant fibers of relatively larger denier that may be used to support a filter or fabric structure. These structural fibers have a denier of at least about 30 dpf.

The structural fibers may range in denier from about 30 dpf to 10,000 dpf or larger depending on the stiffness desired for providing a framework that is resistant to compression and is otherwise dimensionally stable and the size of the ion exchange particle 3 that is chosen. The composite fibers should be present in an amount sufficient to provide a structure to which may be bonded the relatively smaller denier fibers 4.

The composite fibers 1 have a higher melting component and a lower melting component. The higher melting component has a melting point at least about 20° C. higher than the relatively lower melting component. When heated above the melting point of the lower melting component, but below the melting point of the higher melting component, the lower melting component bonds the fibers of the framework together without affecting the structural integrity of the framework that is provided by the higher melting component.

Composite fibers suitable for use as structural fibers in the practice of the invention include bi-component fibers in which the higher and lower melting components are arranged in a side-by-side relationship, or heterofilament fibers having either a concentric or eccentric sheath/core arrangement with the high melting component forming the core and the lower melting component forming the sheath. The term "heterofilaments" as used herein refers to both staple fiber and to continuous filament, unless otherwise specified. The term "fiber" as used herein also refers to both cut staple and to continuous filament, unless otherwise specified.

Composite fibers having a lower melting nylon component and a higher melting polyester component have been found useful for use in the fibrous framework, e.g. a sheath/core heterofilament having a nylon sheath with a melting point from about 175-185° C. and a polyester core with a melting point of from about 240-256° C.

Figure 2:
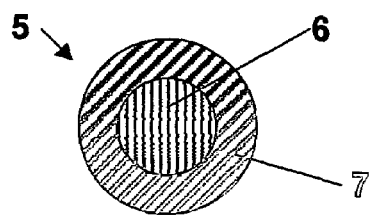
FIG. 2 is a representation of a cross-section through a representative thermoplastic fiber of the present invention.

FIG. 2 shows of a cross-section through a heterofilament 5. Heterofilament fiber 5 is representative of the many types of composite manufactured fibers that may be used for the framework or for attachment of the ion exchange particles 3 of the filter structure.

Fiber 5 is illustrated as a concentric sheath-core heterofilament fiber in which the sheath and the core each comprise about 50% of the cross-sectional area of the fiber. A range of area of the fiber occupied by the sheath is contemplated to be from about 20 to about 80%. The fiber has a lower melting nylon sheath 6 and a higher melting polyester core 7. The sheath should have a melting point that is at least about 20° C. below the melting point of the core and should occupy about half the cross-section of the fiber to provide strong thermal bonding of the fiber structure without adversely affecting the integrity of the core. The core provides strength and integrity to the filter structure.

The framework of relatively large denier structural fibers 1 of the filter structure of the invention all include composite manufactured fibers as described above, having a lower melting component for thermal bonding of the structure at crossover points 2 and for immobilizing relatively smaller denier fibers 4. There are a wide variety of composite fibers having a higher melting component and a lower melting component that are suitable for use in the filter cloth of this embodiment and a heterofilament fiber having a nylon sheath and a polyester core is but one of the broad array of fibers available. The composite fibers 1 may also be in a wide variety of forms including crimped and non-crimped cut staple fibers, short cut staple, continuous filaments or blends thereof.

Smaller denier thermoplastic fibers 4 of the filter structure are immobilized on the framework of larger denier fibers and provide, in addition to the ion exchange particles, active filtration of liquids and gases. These smaller denier fibers also greatly increase the surface available for immobilizing the ion exchange particles. These smaller denier fibers can range in denier from about 1 to 30 dpf. Smaller denier staple fibers and short cut staple are particularly useful in the filter structure, although continuous filaments are also contemplated. Fibers 4 should be present in an amount sufficient to immobilize the particles 3 and to provide a desired filtration at an acceptable pressure drop across the filter.

The smaller denier thermoplastic fibers can be immobilized in the framework of larger denier fibers through the application of heat. Care should be exercised to avoid fusing the smaller fibers into a mass that could adversely impact pressure drop across the filter or otherwise reduce filter efficiency. It has been found useful to use smaller denier fibers that have the same components as the composite structural fibers forming the framework.

For example, if sheath/core heterofilaments of nylon and polyester are used to form the framework, then it is useful for bonding the structure and for immobilizing the smaller diameter fibers and the particles if the smaller denier fibers are also sheath/core heterofilaments of nylon and polyester having similar melting points.

Figure 3:
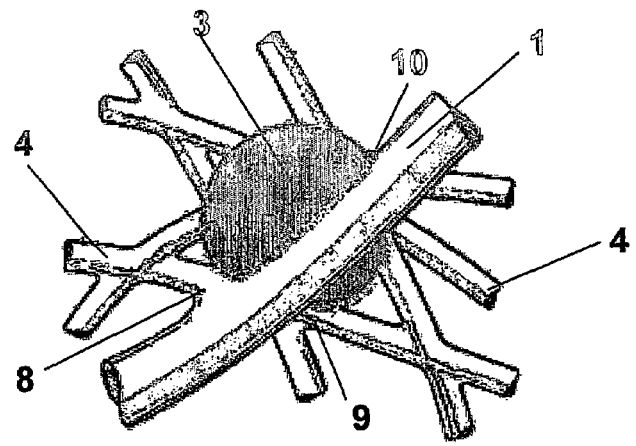
FIG. 3 is a representation of a portion of the filter structure of FIG. 1 showing bonding of the fibers in the filter structure and bonding the ion exchange particles to the fibers of the filter structure.
Figure 4:
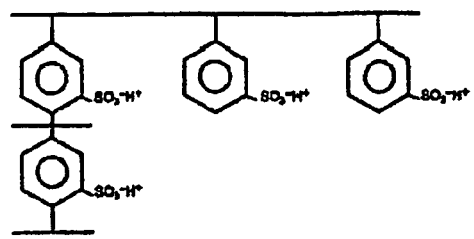
FIG. 4 shows the structure of a strong cation ion exchange particles having —SO3H groups
Figure 5:
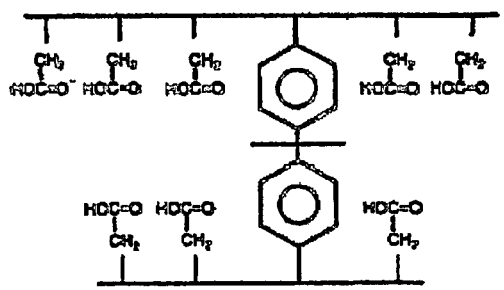
FIG. 5 shows the structure of a weak cation ion exchange particles having —CH2COOH groups
Figure 6:
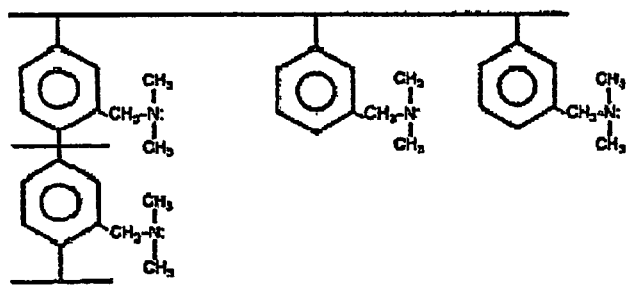
FIG. 6 shows the structure of a strong anion ion exchange particles having —CH2N(CH3)3OH groups
Figure 7:
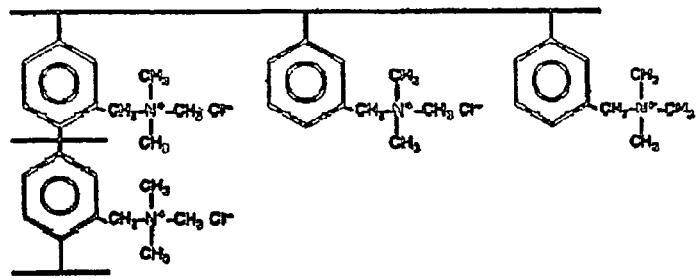
FIG. 7 shows a the structure of weak anion ion exchange particles having —CH2N:(CH3)2 groups

FIG. 3 is a greatly enlarged representation of an ion exchange particle 3 immobilized within a framework of larger denier and smaller denier fibers 1 and 4, respectively. The smaller denier fibers are immobilized on the framework of larger denier fibers at numerous points 8. The particles are fused primarily to the smaller denier fibers at numerous points 9, and may also be bonded to the larger denier fibers as shown at 10. As can be seen from FIG. 3, the filter structure is a cage-like structure in which an ion exchange particle may be entrapped and substantially precluded from migrating. Fusing of the particle to the individual fibers desirably is localized in that the fiber does not form a film over the particle or otherwise substantially reduce the surface area of the particle available for contact with a liquid or gas stream moving through the filter structure.

The composite fiber filter cloth may be produced by a variety of alternative processes, which are described in EP 066095 B1.

The method for expanding the filter cloth so as to form the filter structure of the present invention may be carried out batch-wise or continuously.

In the case of batch-wise humidification the filter cloth is exposed to humid air in a humidification chamber. The humidity of the air in the humidification chamber is preferably 70% and the time for exposure of the filter cloth to humid air is between 4 and 6 hours.

In a continuous humidification process the filter cloth is transported through a humidifying tunnel, in which the humidifying air preferably has a relative humidity of 80-100%. The temperature is 20-60° C. and the exposure time is 1-10 minutes.

The moisture treatment can also be carried out by spraying a water aerosol on to the filter cloth.

The humidification step is followed by pleating of the filter structure, cutting it to the desired dimension and attaching it to the panel frame by means of an adhesive.

In order to achieve a filter panel with low outgassing, i.e. a low amount of gaseous compounds that are released from the filter panel itself, during use, the adhesive should be a polyurethane adhesive, having a total outgassing lower than 10 µg/g, confirmed by thermal desorption gas chromatography mass spectroscopy (TD-GC-MS), with TD performed at 50° C. for 30 min and n-dcecane as external standard.

Figure 8:
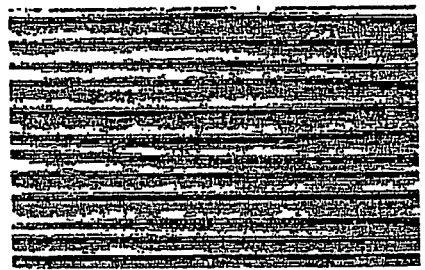
FIG. 8 shows one example of a distorted pleat section of a filter panel

FIGS. 8 and 9 show examples of distorted pleat sections of filter panels. The filter structures of these filter panel were not subjected to a moisture treatment according to the present invention and did thus not contain any free space for the ion exchange particles to swell. As these pleated filter structures were exposed to humid air in a filtering application, the pleats have thus become deformed.

FIG. 10 shows a finished panel after correct humidification and manufacture.

Figure 11:
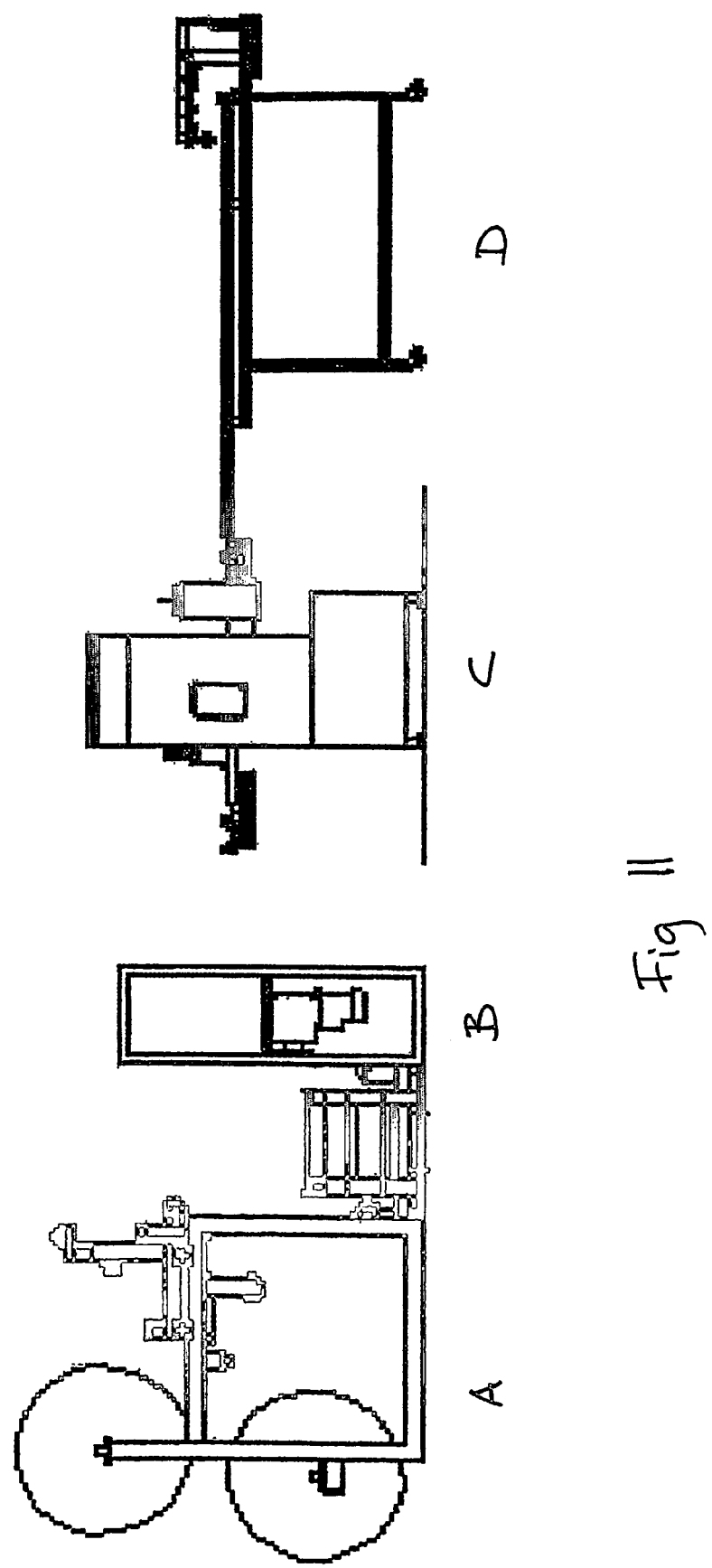
FIG. 11 shows an equipment line for the manufacturing of a filter panel.

An equipment line for the manufacturing of a filter panel is shown in FIG. 11. This equipment line comprises an unwinding stand (A), a humidifier (B), a pleater (C) and a pleat pack treatment table (D).

The invention claimed is:

1. A pleatable filter structure for use in a filter panel, comprising:
    ion exchange particles distributed within a fibrous framework of the filter structure, wherein the filter structure is expanded by a moisture treatment which swells the ion exchange particles and causes a permanent expansion of the filter structure, the moisture treatment comprising exposure to a humid or water-containing environment; and
    the expanded filter structure contains enough space to allow the ion exchange particles to swell or to be in a swelled state without additional expansion of the filter structure.

2. The filter structure of claim 1, wherein the fibrous framework comprises:
    composite structural fibers comprising a first relatively higher melting component and a first relatively lower melting component;
    composite thermoplastic fibers comprising a second relatively higher melting component and a second relatively lower melting component;
    a thermally bonded, fibrous network; and
    ion exchange particles thermally bonded to the composite thermoplastic fibers, wherein
    the first relatively higher melting component has a melting point at least 20° C. higher than the first relatively lower melting component;
    the composite thermoplastic fibers have a relatively smaller denier than the structural fibers;

the first relatively lower melting component bonds the structural fibers together at cross-over points to stabilize the fibrous network;

the composite thermoplastic fibers are dispersed throughout the fibrous network and immobilized by thermal bonding thereto.

3. The filter structure according to claim 1, wherein the expanded filter structure contains enough space to allow an increase of the ion exchange particle diameter of at least 38% as compared to dry particles.

4. The filter structure according to claim 3, wherein the expanded filter structure contains enough space to allow an increase of the ion exchange particle diameter of at least 47% as compared to dry particles.

5. The filter structure according to claim 1, wherein the ion exchange particles are macroporous polymers.

6. The filter structure according to claim 1, wherein the load of ion exchange particles is 100-2000 g/m².

7. The filter structure according to claim 1, wherein the ion exchange particles are monospherical and have a diameter of 425-525 μm.

8. The filter structure according to claim 1, wherein the fibrous framework comprises thermally bonded fibers.

9. The filter structure according to claim 1, wherein the fibrous framework comprises:
a thermally bonded, fibrous network of coarse structural thermoplastic fibers; and
fine thermoplastic fibers of relatively smaller denier than the structural fibers, wherein
the fine thermoplastic fibers are dispersed throughout the fibrous framework and immobilized by thermal bonding boaded to the fibrous framework; and
the ion exchange particles are thermal bonded to the smaller denier composite thermoplastic fibers.

10. A filter panel comprising the filter structure according to claim 1, wherein the filter structure is pleated and fixed into a filter panel frame.

11. The filter panel of claim 10, wherein the pleated filter structure has 0-25 pleats/dm.

12. The filter panel according to claim 10 wherein the height of the pleats is 10-300 mm.

13. The filter panel according to claim 10, wherein the frame is made of stainless steel or aluminum.

14. The filter panel according to claim 10, wherein the pleated filter structure is fixed to the frame with a polyurethane adhesive, which has a total outgassing lower than 10 μg/g, confirmed by thermal desorption gas chromatography mass spectroscopy (TD-GC-MS), with TD performed at at 50° C. for 30 min and n-decane as external standard.

15. The filter panel according to claim 10, comprising exterior sealing strips for avoiding air bypass, wherein the exterior sealing strips are made from a polymer having a total outgassing lower than 10 μg/g, confirmed by thermal desorption gas chromatography mass spectroscopy (TD-GC-MS) with TD performed at 50° C. for 30 min and n-decane as external standard.

16. A method of manufacturing a filter structure, comprising:
subjecting the filter structure to a moisture treatment which swells the ion exchange particles and causes a permanent expansion of the filter structure, the expanded filter structure containing enough space to allow ion exchange particles to swell or to be in a swelled state without additional expansion of the filter structure, wherein the moisture treatment comprises exposure to a humid or water-containing environment.

17. The method of claim 16, wherein the fibers of the fibrous framework are stretched as a result of the swelling of the ion exchange particles, and remain stretched.

18. method according to claim 16, wherein the filter structure is subjected to the moisture treatment until the ion exchange particles have reached a moisture content of at least 20% by weight.

19. The method according to claim 18, wherein the filter structure is subjected to the moisture treatment until the ion exchange particles have reached a moisture content of at least 30% by weight.

20. The method according to claim 16, wherein the ion exchange particles have a moisture content of less than 10% prior to the moisture treatment and present an increase in diameter during the moisture treatment of up to 38%.

21. The method according to claim 16, wherein the humid environment has a relative humidity of at least 70% at a temperature of 20° C.

22. The method according to claim 21, wherein the humid environment has a relative humidity of at least 80% at a temperature of 30° C.

23. The method according to claim 16, wherein the filter structure is subjected to the moisture treatment in a batch process.

24. The method according to claim 16, wherein the filter structure is subjected to the moisture treatment in a continuous process.

25. The filter structure according to claim 6, wherein the load of ion exchange particles is 300-1000 g/m².

26. The filter structure according to claim 25, wherein the load of ion exchange particles is 400-700 g/m².

27. The filter panel of claim 11, wherein the pleated filter structure has 5-20 pleats/dm.

28. The filter panel of claim 27, wherein the pleated filter structure 8-15 pleats/dm.

29. The filter panel according to claim 12, wherein the height of the pleats is 15-150 mm.

30. The filter panel according to claim 29, wherein the height of the pleats is 15-100 mm.

31. The method according to claim 22, wherein the humid environment has a relative humidity of at least 90% at a temperature of 30° C.

* * * * *

UNITED STATES PATENT AND TRADEMARK OFFICE
CERTIFICATE OF CORRECTION

PATENT NO.       : 7,621,989 B2                                              Page 1 of 1
APPLICATION NO. : 10/542617
DATED            : November 24, 2009
INVENTOR(S)      : Mikael Forslund It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Twenty-sixth Day of October, 2010

David J. Kappos
*Director of the United States Patent and Trademark Office*